Oct. 12, 1965

J. FRASER ETAL 3,211,181

SINGLE HANDLE FAUCET

Filed Dec. 5, 1963

INVENTORS
John G. Pecis &
James Fraser

BY Holcombe, Wetherill & Brisebois
ATTORNEYS

Oct. 12, 1965   J. FRASER ETAL   3,211,181
SINGLE HANDLE FAUCET
Filed Dec. 5, 1963   2 Sheets-Sheet 2

INVENTORS
John G. Pecis &
James Fraser
BY
Holcombe, Wetherill & Brisebois
ATTORNEYS

United States Patent Office

3,211,181
Patented Oct. 12, 1965

3,211,181
SINGLE HANDLE FAUCET
James Fraser and John G. Pecis, both of Wilmington, Del., assignors to Speakman Company, Wilmington, Del.
Filed Dec. 5, 1963, Ser. No. 328,362
2 Claims. (Cl. 137—625.17)

This invention relates to a valve structure and a controlling and adjacent means therefor. It has reference, more particularly, to hot and cold water mixing valves suitable for use in faucets equipped with a single valve means by which both the flow and the mixture of hot and cold water can be controlled by one means.

It is an object of the invention to provide a faucet wherein the mixing of hot and cold water and the volume of water so mixed, is controlled by a single means.

It is another object of this invention to provide a mixing faucet having a solid valve spindle therein.

It is still another object of this invention to provide a combination sleeve and spindle which are replaceable within the valve body.

The various features of novelty which characterize this invention are pointed out with particularity in the claims annexed to and forming part of this specification. For a better understanding of the invention, however, its advantages and specific objects obtained with its use, reference is made to the accompanying drawings and descriptive matter in which is illustrated and described a preferred embodiment of the invention.

The drawings illustrate a manually controlled single lever operated deck sink faucet, wherein.

Figure 1:
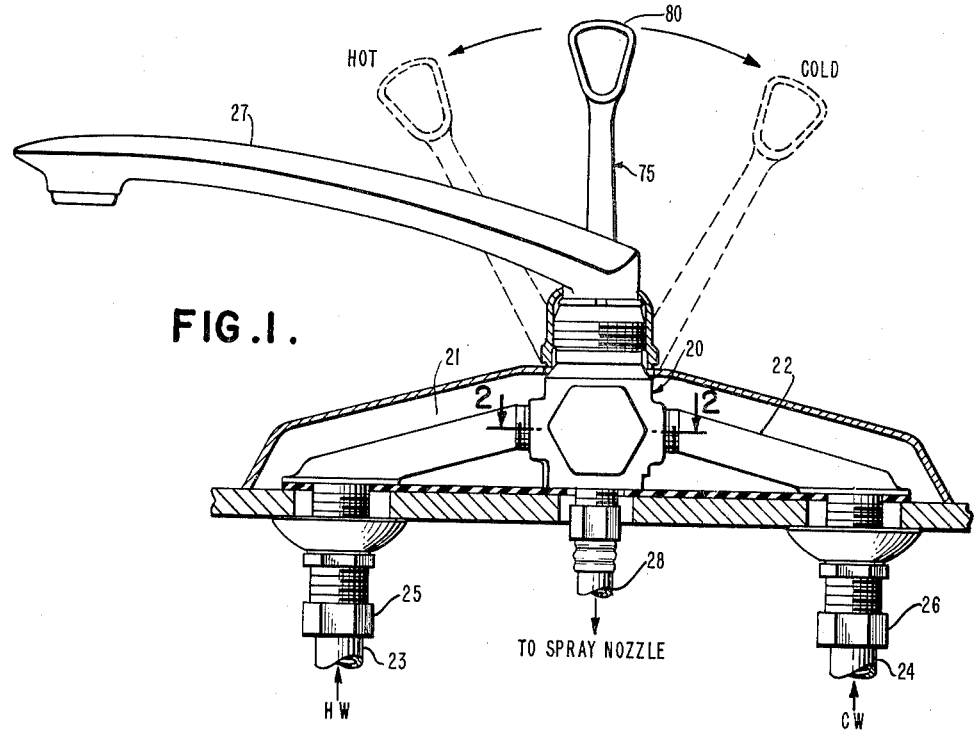
FIGURE 1 is a fragmentary front elevational view of the single handle deck sink faucet of the present invention.
Figure 2:
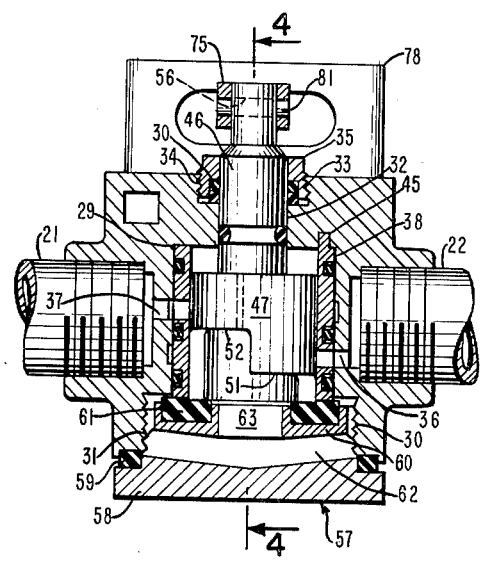
FIG. 2 is an enlarged fragmentary sectional view on line 2—2 of FIG. 1, showing the valve in a closed position.

The deck sink fixture, shown in the drawings, comprises a chambered valve housing or body 20. Connected with this body is a hot water inlet conduit 21 and a cold water conduit 22, shown in FIG. 1. Each of these conduits are connected to a hot water and cold water supply line 23, 24 by means of the coupling devices 25 and 26. Also connected with the valve body 20 is the faucet nozzle 27 and the conduit 28 leading to a spray nozzle, not shown.

The valve body 20 has a chamber 29 therein, which chamber has an enlarged opening 30 in the front thereof, which is provided with screw threads 31 on the interior surface thereof. This chamber 29 is provided with an axial opening 32 in the rear thereof, which opening has an enlarged portion 33 provided with threads on the interior surface thereof, which receive and hold a packing nut 35, shown in FIGS. 2, 3, 4 and 5. The chamber 29 is provided with a cold water port 36 in the sides thereof which is connected to the cold water conduit 22 and is also provided with a hot water port 37 in the opposite side thereof, which is connected to the hot water conduit 21. These ports 36 and 37 are symmetrically spaced on opposite sides of the chamber 29, but the port 36 is longitudinally closer to the front of the chamber, and the port 37 is closer to the rear of the chamber, providing a longitudinal space between these two ports.

Figures 8, 9:
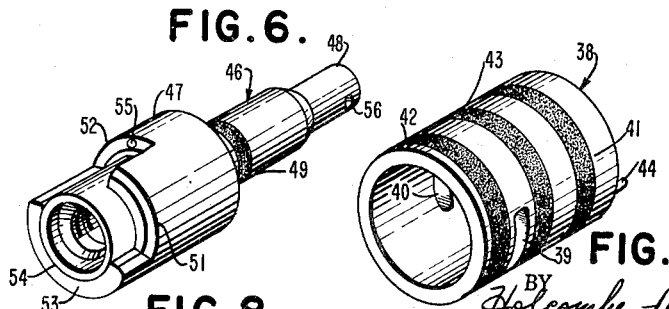
FIG. 8 is an enlarged perspective view of the piston of the present invention.
FIG. 9 is an enlarged perspective view of the sleeve which received the piston shown in FIG. 8.

A hollow sleeve 38, shown in detail in FIG. 9, has two ports 39 and 40 therein, the port 39 being axially spaced symmetrically with the port 40, but the port 40 is displaced longitudinally towards the rear of the sleeve 38. This allows the groove 41 and the groove 42 at each end of the sleeve to have the ports 39 and 40 therebetween. The groove 43 is between the groove 41 and 42 and also between the ports 39 and 40. These grooves are circumferential and will receive and retain O-rings therein. The pin 44 at the rear of the sleeve 38 is received in a circular opening 45 in the rear of the chamber 29 so as to hold the sleeve 38 in position within the chamber 29. The O-rings within the grooves 41, 42 and 43 seal this sleeve in water-tight engagement with the side walls of the chamber 29 and align the port 39 and the sleeve with the port 36 in the side of the chamber 29 and the port 40 with the port 37 in the side of the chamber. The middle O-ring on the exterior surface of the sleeve 38 prevents cross bleeding between the ports 39 and 40 and the end O-rings 41 and 42 prevent leakage from the exterior surface of this sleeve, and maintain it in water-tight engagement with the interior side walls of the chamber 29.

The piston 46 has an enlarged portion 47 and a reduced portion 48 at the end thereof, and an intermediate or shaft portion therebetween. This piston is shown in enlarged detail in FIG. 8. The enlarged portion of this piston fits in and is received by the sleeve 38. The piston has a groove and O-ring 49 thereof, which is received by and held in water-tight engagement with the axial opening 32. Additional packing 50 is held around the exterior portion of this piston by means of the packing nut 35. This has the function of applying enough friction to this piston to prevent water pressure from forcing it into the open position. The enlarged portion 47 of this piston fits in and is retained by the bore of the sleeve 38 and has circumferential portions thereof cut away, as shown in FIG. 8, to produce a shoulder 51, and a second shoulder 52 axially displaced away from the face 53 of the piston and also displaced, with respect to each other, as shown in FIG. 8. A raised lip portion 54 is centrally placed on the face of the piston. A vent hole 55 connects the front shoulder portion 52 with the back of the piston. An opening 56 through the reduced portion 48 receives and holds the operating mechanism hereinafter described.

A front closure structure 57 comprises an outer cap 58 held in water-tight engagement with the front of the chamber 29 by means of the resilient washer 59; raised in spaced relation to this front member 58 is an inner member 60 having a resilient valve seated member 61 recessed in the face thereof. The member 60 is held in spaced relation with the member 58 so as to allow a water chamber 62 therebetween. The inner member 60 has a central discharge outlet 63 therein. This outlet is smaller in diameter than the internal diameter of the raised lip portion 54 of the piston 46.

Figure 4:
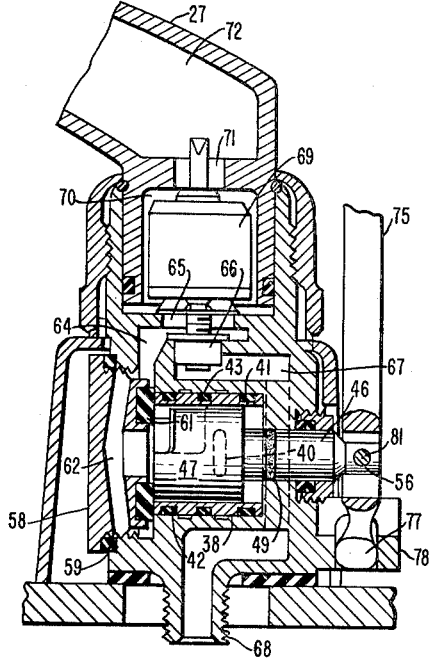
FIG. 4 is an enlarged fragmentary sectional view on line 4—4 of FIG. 2.
Figure 5:
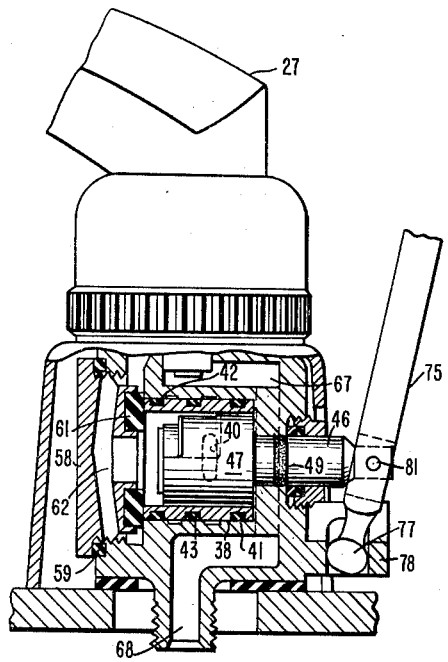
FIG. 5 is an enlarged fragmentary view on line 5—5 of FIG. 3.
Figure 6:
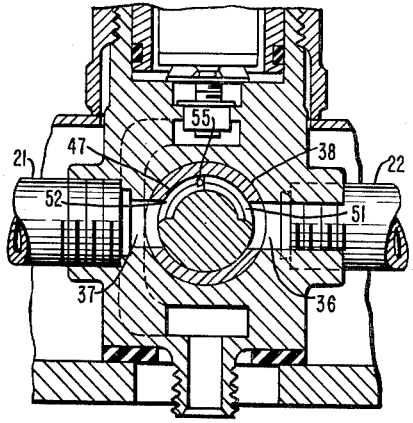
FIG. 6 is an enlarged fragmentary sectional view on line 6—6 of FIG. 3.
Figure 7:
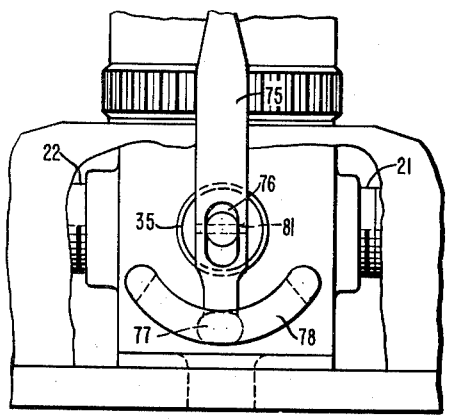
FIG. 7 is a fragmentary rear elevational view of the faucet shown in FIG. 1.

The water chamber 62, shown in FIGS. 4 and 5, has connected to it a water conduit 64 which has a water port 65 in the upper portion thereof and a water port 66 in the lower portion thereof. The water port 66 admits water to the conduit 67 flowing around the exterior part of the valve chamber and is connected to the outlet port 68 to which is attached the spray nozzle conduit 28. The transfer valve 69 of the usual type of construction controls the flow of water through the ports 65 and 66 so as to allow the water to flow downwardly into the chamber 67 and into the water port 68 to the spray nozzle conduit 28, or this transfer valve will allow the water to flow upwardly into the conduit 70 through the water port 71 into the chamber 72 of the nozzle 27.

The handle 75 has a central opening 76 near the bottom thereof and below this opening a ball 77 on the end thereof. This ball fits within the race 78 integrally formed on the back of the chamber block 79, and limits the rotational movement of the ball, which provides a pivot point for longitudinal movement of the flattened upper portion 80 of the handle 75. The central opening 76 of the handle is provided with an opening therethrough, which may be aligned with the opening 56 in the end portion of the piston 46 and receives a pin 81 therethrough so as to retain the handle 75 in an operating position on the piston 46.

Figure 3:
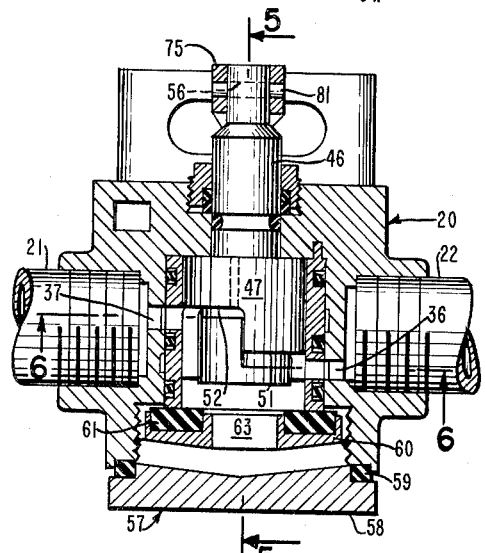
FIG. 3 is a view similar to FIG. 2 showing the valve in the open position.

In operation, the sleeve is received by the chamber 29 and held in position therein by the pin 44 on the rear of the sleeve, and the piston is received by and held in position in the sleeve by the handle 75, in the rear thereof. When the handle is in the central position, shown in FIG. 1, and pulled towards the front of the faucet, the piston takes the position shown in FIG. 2, and the shoulder 51 overlies the port 39 in the side of the sleeve 38, and the shoulder 52 overlies the port 40 in the side of the sleeve 38. The raised lip portion 54 on the face of the piston is brought into contact with the resilient member 61 on the inner surface of the inner cap 60 and prevents water from entering through the ports 36 and 37, or being discharged through the central discharge port 63. As the handle 75 is pushed rearwardly the central discharge port 63 opens and then simultaneously the shoulders 51 and 52 open the ports 39 and 40 in the sleeve, and a mixed water, both hot and cold, is discharged through the nozzle 27, or through the spray nozzle, if that device is in the open position. When the handle is pushed rearwardly to the extreme position, the valve then opens the ports 39 and 40 completely, as shown in FIG. 3. If the handle 75 is rotated to the cold position, as shown in dotted lines in FIG. 1, the hot water port 40 is closed and the cold water port 39 is opened to expose more of this port to the flow of water. When the handle is reversed, the cold water port is closed and the hot water port is opened. The shoulder 51 and the shoulder 52 on the piston 46 constitutes approximately 50% of the circumference of the piston and therefore provides a constant volume of water with the rotation of the piston from the hot to the cold position. The ports in the sleeve are symmetrically spaced with respect to the axis of the sleeve, as pointed out above, and allows this piston to produce this constant flow. The volume of the flow can be varied by longitudinal movement of the piston within the chamber. The vent opening 55 prevents the piston from becoming water locked as it allows water pressure on both sides of the enlarged portion of the piston to remain the same.

When it is desired to replace the operating mechanism of this valve structure, the water in the water mains is turned off, the front closure structure 57 is removed, the handle is pushed into the full open position, a screw driver is inserted over the shoulder 51 into the port 39 and the handle is then pulled into the forward position. This forces the sleeve 38 forward with the piston so that the sleeve protrudes from the chamber 29. The pin 81 is then removed and the piston 46 and the sleeve 38 are removed from the valve structure. As these are the only parts that receive any wear they are the only parts that have to be replaced. A new sleeve 38 and a new piston may then be inserted in the chamber 29, the handle repositioned on the piston and the pin 81 replaced. The front closure structure is then replaced and the water mains opened and the valve is again in operation. It is not necessary to remove any of the permanently mounted parts of this valve from the sink.

While in the above specification O-rings are referred to as a sealing means, rings other than O-rings may be used, that is, rings having square cross sectional areas or lip portions on the circumference thereof will function as well as O-rings.

What is claimed is:

1. A proportioning and volume controlling valve comprising the combination of:
   (a) a valve body having a longitudinally extending cylindrical first bore provided with inlet ports in opposite sides thereof,
   (b) a sleeve mounted in said first cylindrical bore having a second cylindrical bore therein, said sleeve having inlet ports therein which are offset with respect to each other and are in alinement with the inlet ports in said body portion, said sleeve having sealing means on the exterior surface thereof to maintain it in water-tight engagement with said first bore, at least one of said sealing means separating said inlet ports,
   (c) a piston mounted on the end of a shaft, rotatably and longitudinally slidably adjustable in said second bore, said piston having a boss on the inner end thereof overlying said inlet ports, said boss having a portion cut away so that on rotation at least a portion of each port will be exposed, at least one axially spaced vent through said boss, a raised circular lip on the face of said piston,
   (d) a cap closing the front of said valve body and having a raised valve seat portion mounted on the inner surface of said cap and in water-tight engagement with said valve body, an exhauast port in the center of said valve seat portion, which port is closed by said raised lip on the face of said piston when in the closed position, an exhaust chamber for mixed water communicating with said exhaust port behind said raised valve seat portion having lateral discharge ports from said discharge chamber,
   (e) and an operating means comprising a single lever pivoted on said shaft in the rear of said piston at the lower end of said lever, a lower pivot on the end of said lever to impart to said piston through said shaft longitudinal and rotational motion.

2. A proportioning and volume controlling valve comprising the combination of:
   (a) a valve body having a longitudinally extending cylindrical first bore provided with inlet ports in opposite sides thereof,
   (b) a sleeve mounted in said first cylindrical bore having a second cylindrical bore therein, said sleeve having inlet ports therein which are offset with respect to each other and are in alinement with the inlet ports in said body portion, said sleeve having sealing means on the exterior surface thereof to maintain it in water-tight engagement with said first bore, at least one of said sealing means separating said inlet ports,
   (c) a piston mounted on the end of a shaft, rotatably and longitudinally slidably adjustable in said second bore, said piston having a boss on the inner end thereof overlying said inlet ports, said boss having a portion cut away so that on rotation at least a portion of each port will be exposed, at least one axially spaced vent through said boss, a raised circular lip on the face of said piston,
   (d) a cap closing the front of said valve body and having a raised valve seat portion mounted on the inner surface of said cap and in water-tight engagement with said valve body, an exhaust port in the center of said valve seat portion, which port is closed by said raised lip on the face of said piston when in the closed position, an exhaust chamber for mixed water communicating with said exhaust port behind said raised valve seat portion having lateral discharge ports from said discharge chamber, (e) and an operating means comprising a single lever pivoted on said shaft to the rear of said piston near the lower end of said lever, a ball on the lower end of said lever being retained within a race mounted on said valve body, said race allowing rotation of said piston and acting as a pivot point to impart sliding motion to said piston.

References Cited by the Examiner

UNITED STATES PATENTS

| 1,943,865 | 1/34 | Hennessey | 137—625.17 |
| 1,949,300 | 2/34 | Fitter | 137—625.17 |
| 2,490,726 | 12/49 | Bauberger | 137—625.17 |
| 2,649,919 | 8/53 | Weaver et al. | 251—333 X |
| 2,682,715 | 7/54 | Walby | 137—636.4 X |
| 2,975,806 | 3/61 | Moen | 137—625.17 |

M. CARY NELSON, *Primary Examiner.*